United States Patent
Craft et al.

(10) Patent No.: US 8,626,756 B1
(45) Date of Patent: *Jan. 7, 2014

(54) TAGGING DATA ASSETS

(75) Inventors: Daniel H. Craft, Mountain View, CA (US); Joseph Pasqua, Menlo Park, CA (US); Perry A. Caro, San Jose, CA (US); Daniel C. Brotsky, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1297 days.

This patent is subject to a terminal disclaimer.

(21) Appl. No.: 11/874,148

(22) Filed: Oct. 17, 2007

Related U.S. Application Data

(63) Continuation of application No. 10/672,252, filed on Sep. 25, 2003, now Pat. No. 7,287,029, which is a continuation of application No. 09/224,915, filed on Jan. 4, 1999, now Pat. No. 6,704,739.

(51) Int. Cl.
*G06F 7/00* (2006.01)
*G06F 17/30* (2006.01)

(52) U.S. Cl.
USPC ..... 707/726; 707/769; 707/794; 707/999.005

(58) Field of Classification Search
USPC ............... 707/726, 758, 999.2, 999.002, 769, 707/794, 999.005
See application file for complete search history.

(56) References Cited

U.S. PATENT DOCUMENTS

| | | | |
|---|---|---|---|
| 5,404,506 A * | 4/1995 | Fujisawa et al. | 1/1 |
| 5,493,677 A | 2/1996 | Balogh et al. | |
| 5,617,119 A | 4/1997 | Briggs et al. | |
| 5,644,740 A * | 7/1997 | Kiuchi | 715/853 |
| 5,787,417 A * | 7/1998 | Hargrove | 1/1 |
| 5,794,242 A | 8/1998 | Green et al. | |
| 5,875,446 A * | 2/1999 | Brown et al. | 1/1 |
| 5,878,406 A * | 3/1999 | Noyes | 706/55 |
| 5,897,634 A | 4/1999 | Attalur et al. | |
| 5,903,867 A * | 5/1999 | Watari et al. | 704/270 |
| 5,937,415 A | 8/1999 | Sheffield et al. | |
| 5,970,505 A * | 10/1999 | Ebrahim | 715/236 |
| 5,987,454 A | 11/1999 | Hobbs | |
| 6,049,799 A | 4/2000 | Mangat et al. | |
| 6,052,693 A | 4/2000 | Smith et al. | |
| 6,055,543 A | 4/2000 | Christensen et al. | |
| 6,065,026 A | 5/2000 | Cornelia et al. | |

(Continued)

OTHER PUBLICATIONS

Library of Congress, Cataloging Distribution Service, Subject Heading, 19th Edition, vol. 1, A.-C, pp. vii-xvii, Washington, DC, Aug. 1996.

(Continued)

*Primary Examiner* — Shew-Fen Lin
(74) *Attorney, Agent, or Firm* — Schwegman Lundberg Woessner P.A.

(57) ABSTRACT

Systems and apparatus, including computer program products, for tagging data assets. In one aspect, a computer program product includes instructions operable to cause a computer to establish a database of concept data elements, asset references, and associations. The concept data elements each represent a concept and have a hierarchy specified by concept hierarchy information. The asset references each include a storage location identifier for a corresponding one of a plurality of data assets. Each association defines a type of relationship, from a plurality of types of relationships, between a data asset and a concept represented by a concept data element.

23 Claims, 12 Drawing Sheets

(56) References Cited

U.S. PATENT DOCUMENTS

| | | | |
|---|---|---|---|
| 6,088,694 A | | 7/2000 | Burns et al. |
| 6,101,556 A | | 8/2000 | Piskiel et al. |
| 6,134,540 A | | 10/2000 | Carey et al. |
| 6,154,213 A | * | 11/2000 | Rennison et al. .............. 715/854 |
| 6,226,792 B1 | * | 5/2001 | Goiffon et al. ................ 717/120 |
| 6,327,593 B1 | | 12/2001 | Goiffon |
| 6,453,312 B1 | * | 9/2002 | Goiffon et al. ........................ 1/1 |
| 6,460,034 B1 | * | 10/2002 | Wical .................................... 1/1 |
| 6,704,739 B2 | | 3/2004 | Craft et al. |
| 6,785,882 B1 | * | 8/2004 | Goiffon et al. ................ 717/120 |
| 7,287,029 B1 | | 10/2007 | Craft et al. |

OTHER PUBLICATIONS

Lisa Singh et al., "Generating Association Rules from Semi-Structured Documents Using an Extended Concept Hierarchy", CIKM 97 Las Vegas, NV, 1997, pp. 193-200.

* cited by examiner

500 → _Asset_Refs_

| ID | Class | Format | Encoding | URI |
|---|---|---|---|---|
| 202 | 219 | image/photos | base64 | file:///c/personal/file863.psd |
| 201 | 219 | text/html | base64 | http://ATG_AB/A839D1O02Q |

Fig. 5

600 → Concepts

| ID | Concept Name | Is_Anonymous |
|---|---|---|
| 210 | "Product" | No |
| 211 | "Computer S/W" | No |
| 212 | "Computer H/W" | No |
| 213 | "Illustrator" | No |
| 214 | "Printer" | No |
| 215 | "anonymous0215 | Yes |
| 216 | "Monochrome" | No |
| 217 | "Duotone" | No |
| 218 | "Color" | No |
| 219 | "Document" | No |
| 220 | "Person" | No |
| 221 | "Simons" | No |
| 222 | "Jones" | No |
| 223 | "Email" | No |
| 224 | "Jasper" | No |

625 → Concept_Instances

| ID | Concept |
|---|---|
| 240 | 214 |
| 241 | 216 |
| 242 | 221 |
| 243 | 222 |
| 244 | 223 |
| 245 | 224 |

650 → Concept_Refinements

| Descendent | Ancestor | Min_Distance | |
|---|---|---|---|
| 211 | 210 | 1 | ← 651 |
| 212 | 210 | 1 | ← 652 |
| 213 | 211 | 1 | ← 653 |
| 214 | 212 | 1 | ← 654 |
| 216 | 215 | 1 | |
| 217 | 215 | 1 | |
| 218 | 215 | 1 | |
| 221 | 220 | 1 | |
| 222 | 220 | 1 | |
| 213 | 210 | 2 | ← 660 |
| 214 | 210 | 2 | |

Fig. 6

700 → Relations

| ID | Relation Name |
|---|---|
| 401 | "Pub Info" |
| 402 | "Encounter Info" |
| 276 | "Title" ← 703 |
| 273 | "Primary Author" |
| 272 | "Author" |
| 274 | "Encounter Via" |
| 275 | "Encounter On" |
| 277 | "Colorant" |

725 → Relation_Refinements

| Descedent | Ancestor | Min_Distance | |
|---|---|---|---|
| 272 | 401 | 1 | ← 726 |
| 276 | 401 | 1 | ← 727 |
| 273 | 272 | 1 | ← 728 |
| 275 | 402 | 1 | |
| 274 | 402 | 1 | |
| 273 | 401 | 2 | |

Fig. 7

800 → Strings

| ID | Value |
|---|---|
| 260 | "HP 1703 Specification" |

825 → Numbers

| ID | Value |
|---|---|
| - | - |

850 → Dates

| ID | Value |
|---|---|
| 261 | 12-Jan-97 |

Fig 8

900 → Associations

| Relation | Source | Source_Type | Target | Target_Type | Is_A_Detail |
|---|---|---|---|---|---|
| 276 | 201 | A | 260 | S | No |
| 273 | 201 | A | 243 | I | No |
| 272 | 201 | A | 242 | I | No |
| 274 | 201 | A | 244 | I | No |
| 275 | 201 | A | 261 | D | No |
| - | 201 | A | 245 | I | No |
| - | 201 | A | 240 | I | No |
| 277 | 240 | I | 241 | I | Yes |

Fig 9

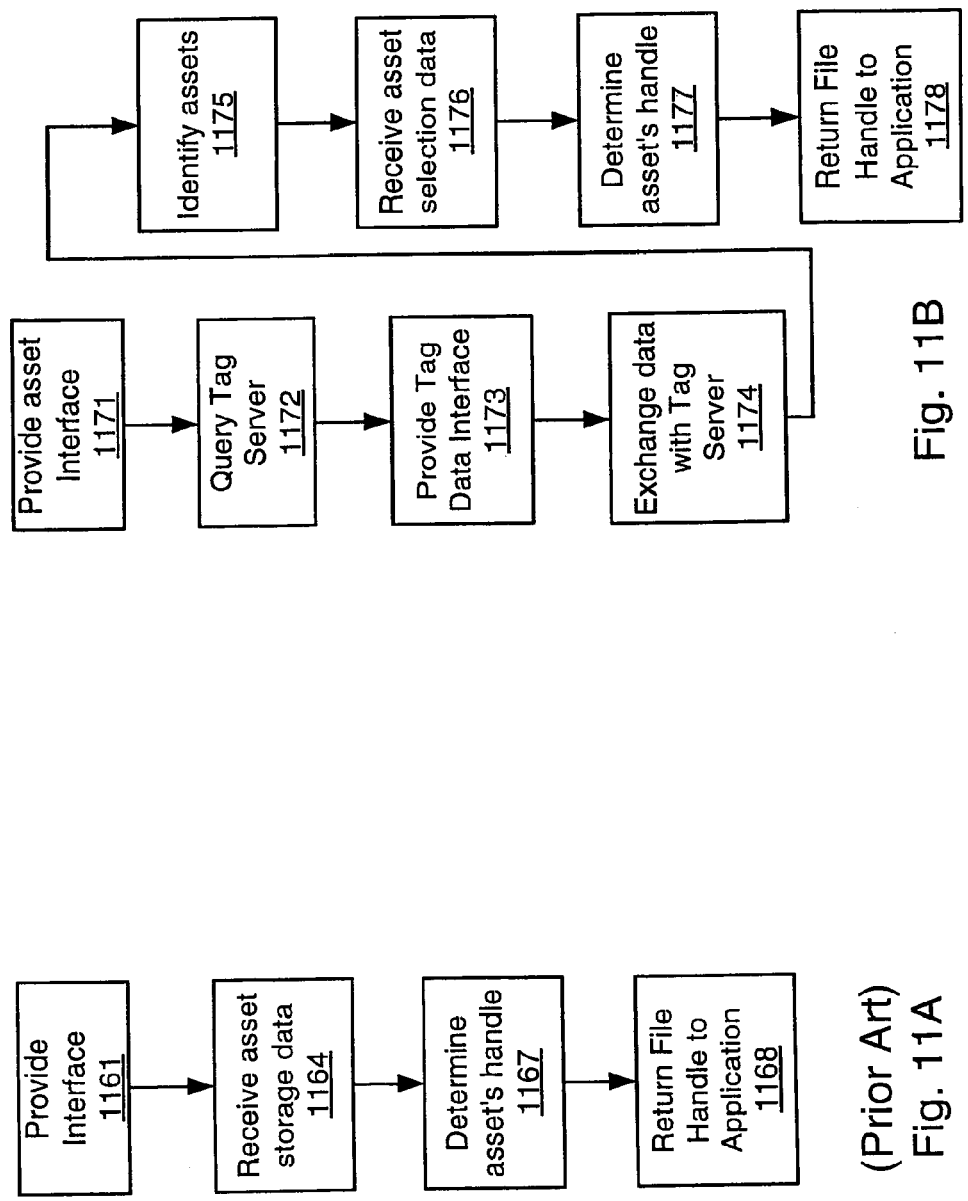

TAGGING DATA ASSETS

CROSS-REFERENCE TO RELATED APPLICATIONS

This application is a continuation application of, and claims priority to, U.S. patent application Ser. No. 10/672,252, entitled TAGGING DATA ASSETS, which was filed on Sep. 25, 2003, which is a continuation of U.S. patent application Ser. No. 09/224,915, entitled TAGGING DATA ASSETS, which was filed on Jan. 4, 1999, now issued as U.S. Pat. No. 6,704,739. The disclosures of the above applications are incorporated herein by reference in their entirety.

BACKGROUND

This invention relates to tagging data assets.

Diverse types of digital assets are stored in computer systems. For example, a computer system can store files and database records containing electronic mail messages, digitized photographs, compressed motion video, sound, and text. Such information can be stored as file objects in a hierarchically-arranged directory tree, or as records within a relational database. Some storage systems have limited organization capabilities that are restricted by static relationships between the stored digital asset and its location in the file system directory hierarchy or database.

Improvements in the logical organization, storage, and retrieval of digital assets can be obtained using metadata. Metadata, also referred to as "data about data," is information that can be used to describe characteristics of a stored asset and that can be altered independently of the asset itself. For example, metadata can be used to describe the author and creation data of a graphic image file without altering the stored graphic image.

SUMMARY

In general, in one aspect, the invention features a method of responding to a user request that a computer program application open a data asset. The method includes presenting to the user a location interface to receive data asset location information from the user to locate a desired data asset. The location interface is linked to a searchable tag database that includes concept data elements, asset references, and associations. Concept data elements each represent a concept and have a hierarchy specified by concept hierarchy information. Asset references each comprise a storage location identifier for a corresponding data asset. Each association represents a relation between a data asset and a concept. The method also includes receiving from the user a query identifying a concept and a relation. In response to the query, the tag database may be used to identify a set of data assets each having a specified relation with an identified concept. The identified set of data assets may thereafter be presented to the user.

In general, in another aspect, the invention features a computer program product, tangibly stored on a computer-readable medium, for responding to a user request that a computer program application open a data asset. The program includes instructions operable to cause a computer to present a location interface to the user, instructions to receive data asset location information from the user, instructions to link the location interface to a searchable tag database of concept data elements, asset references, and associations, instructions to receive a query identifying a concept and a relation, instructions to use the tag database to identify a set of data assets each having the relation with the concept, and instructions to present information identifying the set of data assets.

Implementations may include one or more of the following features. The tag database can include a plurality of relation data elements. Each relation data element represents a relation between other tag database elements. Relations can have a hierarchy specified by relation hierarchy information. A tag data interface can be used to display concepts and relations that can be searched for during an "open" operation. A user can use the tag data interface to select elements defining a query. In response to the query, information identifying a set of data assets satisfying the query can be displayed. The set of data assets can be identified by finding each asset reference in the tag database having a specified relation (or a relation that is hierarchically related to the specified relation) with an identified concept (or with a concept what is hierarchically related to the identified concept). A query can identify multiple associations (each represented by a concept and corresponding relation) that are logically grouped. For example, multiple associations may be grouped using boolean logic operations. A user can use the tag data interface to select a data asset from the set of data assets, and a file handle for the selected asset can be returned to the application.

In general, in another aspect, the invention features a method of responding to a user request that a computer program application save a data asset. The method includes presenting a storage interface to the user and linking the storage interface to a searchable tag database. The storage interface can be used to receive location information from the user to identify a storage location identifier for a data asset to be saved. The tag database includes concept data elements, asset references, and associations. The method also includes receiving location information and an association for the data asset being saved, and storing an asset reference and the association in the tag database.

Implementations may include one or more of the following features. Information identifying all concepts and relations that can be selected during a "save" operation can be received from the tag database and displayed to a user through a tag data interface. The tag data interface can be used to select tag elements identifying associations for an asset. A tag creation interface can be provided to a user to define concepts, relations, and the hierarchical organization of concepts and relations. The asset location information may be a file name or a database identifier.

The invention may provide one or more of the following advantages. Digital assets can be stored and organized based on user-defined criteria. Asset organization restrictions imposed by a computer file system hierarchy can be reduced. Dynamic organization of documents based on query parameters can be provided. Text-based descriptive data can be associated with non-text data. Organization, storage, and retrieval of assets by descriptive parameters can be provided. Descriptive information can be associated with stored data without altering the data's contents.

DESCRIPTION OF DRAWINGS

FIGS. 5-9 are relational database tables according to the invention.

FIGS. 11A and 11B are operating system procedures, according to the invention

DETAILED DESCRIPTION

Figure 1:
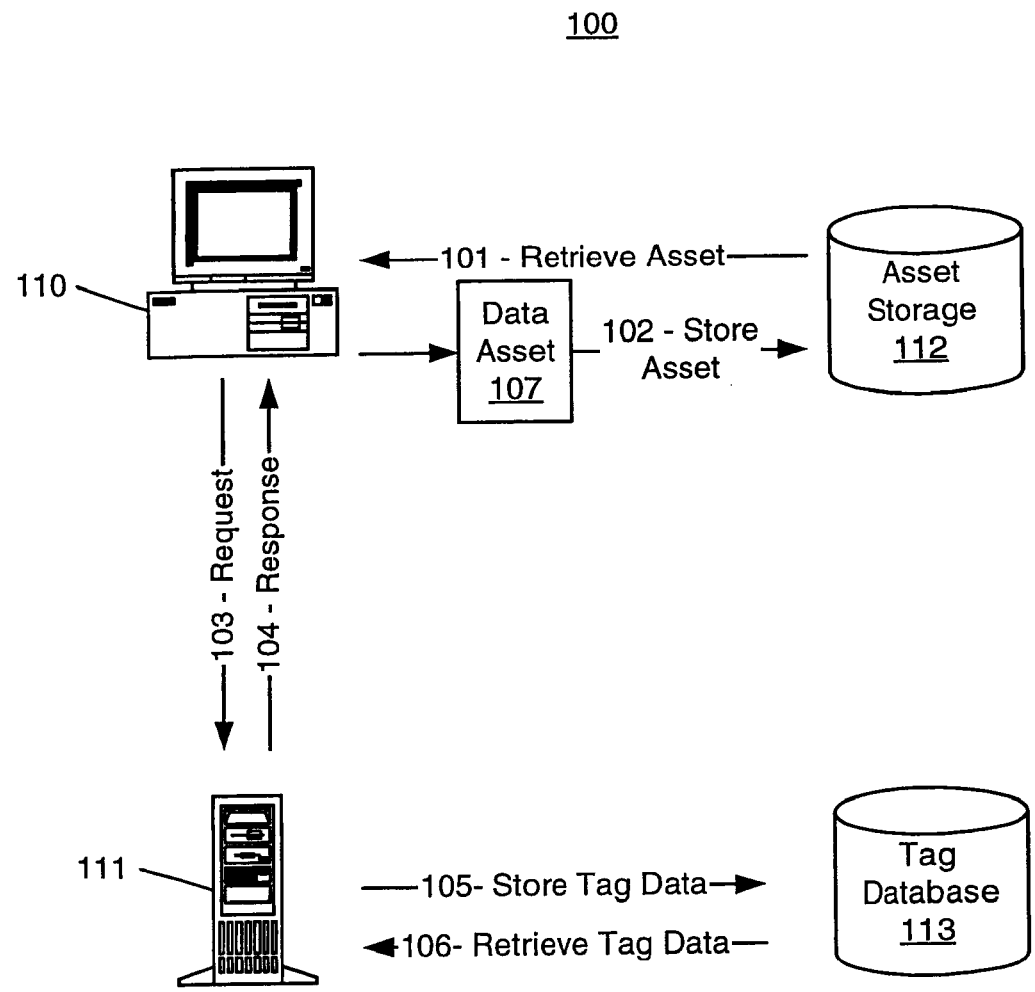
FIG. 1 is a computer system according to the invention.

As shown in FIG. 1, a computer 110 includes software applications used to create and store data assets. These data assets can include word processing files, database files, picture files, database records, or any other type of electronically stored data. Once a data asset has been created, it can be stored in an asset storage system 112 (which may be a disk-based file system). Assets stored in the system 112 may thereafter be retrieved by the computer 110 as well as by other computers having access to the data asset on the storage system 112. The storage system 112 can include multiple physical devices and can include local and remote storage devices. For example, the storage system 112 can include a local hard disk drive of computer 110 as well as remote server-based storage, storage across multiple servers on a network, and storage in a database. Assets in the storage system 112 can be organized in a hierarchical manner, such as files stored in a UNIX™ file system, or may be loosely organized, such as files stored across multiple computers connected by the Internet network, or may be rigidly organized, such as records stored in a relational database.

The logical arrangement, cataloging, storage, and retrieval of data assets in the storage system 112 is facilitated by metadata tags ("tags") associated with the stored data assets. Tags are used to represent concrete or abstract objects and ideas, and are used to organize data assets in the storage system 112 by relationships established between the tags and data assets. In the system 100, tags are stored in a tag database 113 and, through software operations of the computer system 110 and of a tag-database server 111, relationships are established between the tags and data assets. The relationships between tags in the database 113 and data assets in the storage system 112 can be independent of data asset storage types, the applications that create the data assets, and the arrangement of the assets in the storage system 112.

Tags can be stored in a tag database 113 by the tag database server 111. Software programs executing on the computer 110 send requests 103 to the server and receive responses 104 from the server to access and alter tag data. Tag data manipulation and access requests 103 and tag server responses 104 can be exchanged when a data asset is initially created and stored in the storage system 112, when an existing data asset is altered, or at other times as may be determined by a user of the computer system 110. For example, a data asset 107 can be an Adobe FrameMaker® Version 5.5 file. The asset 107 can be stored in the system 112 by selecting the 'Save' operation from the FrameMaker 'File' menu and designating the storage system 112 as the storage destination for the asset 107. Contemporaneous with the saving of file 107, actions to create and/or alter tag data can be performed at the computer 110 and server 111. For example, on a Microsoft Windows 95® system, tag data can be created at the computer 110 using modified operating system 'Save' procedures. The modified 'Save' procedures, as will be explained later, can provide an interface to a user at the computer 110 to receive tag data information or to derive tag information from file 107 contents. The tag data received from the user or derived from the file 107 can then be sent to the server 111 for storage in the tag database 113. As explained below, the tag data sent to the database 113 can be interrelated with tag elements existing in the database 113 to logically catalog and logically organize the asset 107.

Figure 2:
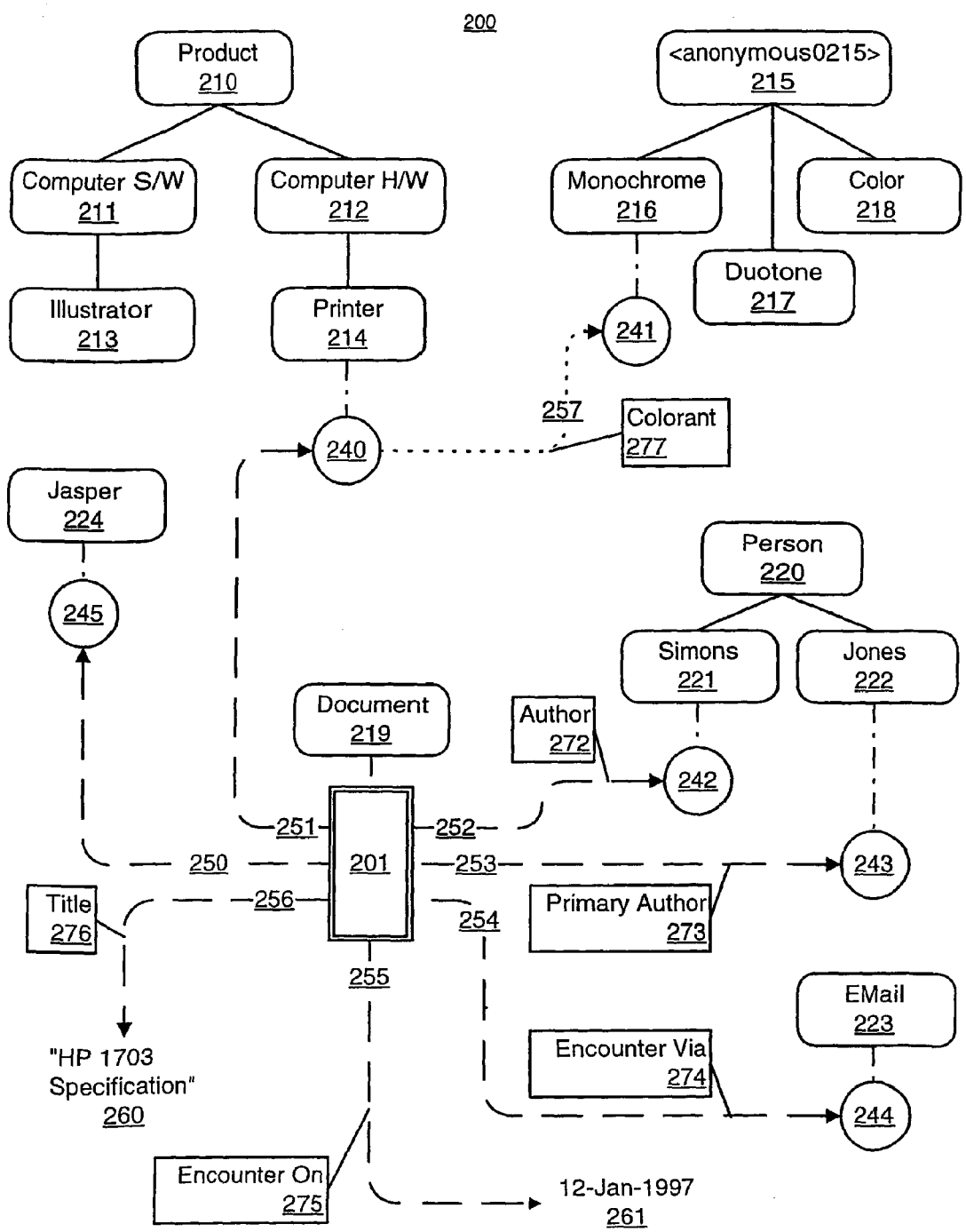
FIG. 2 is a semantic network according to the invention.

The logical organization and cataloging of tag data in the database 113 is provided through the use of a tag model. The tag model includes several tag categories and defines relationships allowed between tags of a given category and between tags in different categories. These tag relationships can be logically represented in the form of a semantic network (known herein as a "tag network"). As shown in FIG. 2, a tag network 200 is a lattice or graph structure formed from interconnected nodes 201, 210-224, and 240-245. The tag network 200 provides a metadata description of an asset represented by node 201. As described by the tag network 200, and as will be more fully explained below, the asset represented by node 201 is a document about monochrome printers entitled "HP 1703 Specification," is related to a project named Jasper, has an author named "Simons" and a primary author named "Jones."

A tag semantic network can represent assets in the storage system 112 (FIG. 1) using asset reference tags ("asset references"). For example, the network 200 includes the asset reference 201. An asset reference is directly related to an asset stored in the storage system 112. Asset references include pointer data identifying a method to retrieve a stored asset. The stored pointer data can include a hierarchical file system directory and file name, a URI (Uniform Resource Identifier), a Structured Query Language (SQL) program, or other asset retrieval information. Asset references can also include additional data, such as the asset type and information about the asset's representation in the storage system 112. Each asset reference in the network 200 can be formed by operating system procedures that provide appropriate pointer data and instructions to a tag server 111 when data assets are stored in the storage system 112 (FIG. 1).

A tag network includes various metadata elements that can be interrelated and used to describe stored assets. One tag model metadata type, referred to as a "named concept," is used to describes concrete or abstract idea that a user may wish to interrelate with asset references. For example, the idea of a computer printer is represented by concept 214 uniquely named "Printer." Named concepts can be associated with asset references, and with other tags in a tag network. Named concepts can be created using an interface provided at computer 100 or server 111 whereby a user can enter unique text strings describing a concept. After entry of the unique text string, data storage instructions are provided to the server 111 to store each string as a concept in the tag database 113. Additionally, associations between named concepts and asset references can be created by a user using an interface provided at computer 100 or server 111.

Figure 3A:
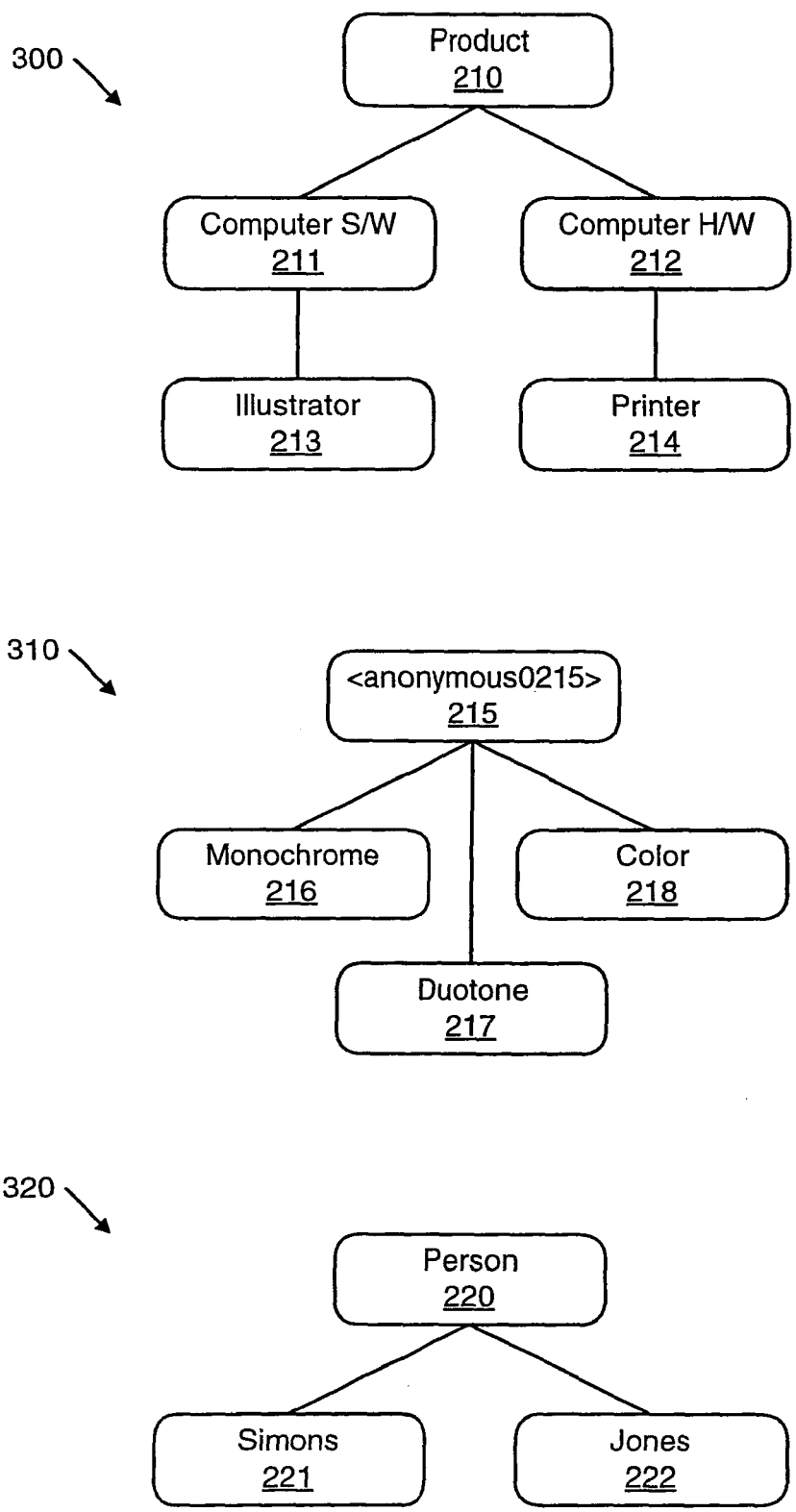
FIGS. 3A and 3B are hierarchies of data elements according to the invention.

Named concepts can be hierarchically organized through the use of user-specified refinements. In the tag network 200, refinements are shown as solid lines interconnecting named concepts 210-218, and 220-222. As shown in FIGS. 2 and 3A, refinements interconnecting named concepts 210-218 and 220-222 establish three concept hierarchies. The first hierarchy 300 includes concepts 210-214 related to product types, the second hierarchy 310 includes concepts 214-218 related to printer color capabilities, and the third hierarchy 320 includes concepts 220-222 related to people. Concept hierarchies allow a parent concept to be partitioned into multiple child concept subdivisions. Additionally, concept hierarchies can be used to establish peer relationships among concepts. For example, in the semantic network 200, the parent concept "Product" 210 is subdivided into two child concepts "Computer S/W" 211 and "Computer H/W" 212. The child concepts 211 and 212 are peers since they are each direct refinements of a common parent concept 210. A concept may also have multiple parent concepts if it is a logical subdivision of each. Thus, concepts may be flexibly arranged in a variety of lattice or directed graph structures. For example, a user may organize a "car" concept as a subdivision of a "product" concept but also consider the "car" concept as a subdivision of a "entertainment" concept (not shown) if he or she is a car enthusiast. Refinements may be specified by a user using a graphical user interface (GUI) at the computer 110 or server 111 to specify parent-child relationships. For example, a user can specify a parent-child relationship by dragging a graphical icon representative of a child concept onto a graphical icon representative of a parent concept.

The hierarchical organization of concepts facilitates navigation of a tag network and facilitates searching for data in the tag network. For example, a user may wish to search the tag network 200 to retrieve all assets associated with the product concept 210. To do so, a user may select the product concept 210 using a search query interface provided at computer 110. As can be seen in FIG. 2, no asset references are directly associated with the product concept 210. However, the network 200 includes asset reference 201 that is associated with the printer concept 214 through a concept instance 240. As will be explained below, each concept instance functions as a logical-surrogate for the concept that it is an instance of. Using information concerning the hierarchical relationship 300 (FIG. 3A) among concepts 210-214, a tag network search routine can determine that the printer concept 214 is a subdivision of the computer hardware concept 212 which, in turn, is a subdivision of the product concept 210. A tag network search routine can therefore conclude that the printer concept 214 is a subdivision of the product concept and therefore the printer concept 214 logically satisfies a search for the product concept 210. The search routine can therefore determine that asset reference 201 satisfies a query for assets associated with the product concept 210.

In the above example, it was appropriate for the search routines to consider subdivision of a concept when trying to find a match for the concept in the network. In other instances it is appropriate to search only for the specific concept or even to consider the ancestors rather than descendents. This may be specified as search routine query parameters.

A tag network can also include anonymous concepts. Like named concepts, anonymous concepts can be joined by refinements to other anonymous concepts and to named concepts. Unlike named concepts, however, anonymous concepts do not require a unique distinguishing name. Instead, anonymous concepts are uniquely distinguished by the refinement relations between the anonymous concept and other anonymous or named concepts. Anonymous concepts can be used to group descendent concepts and alter peer relationships among concepts in a concept hierarchy.

Implementations of the tag model can also include interconnection points 240-245, referred to as "concept instances." Concept instances function as logical surrogates for the concepts that they are instances of. Concept instances can be used to organize and structure logical interconnection between concepts and other types of metadata in a tag network. For example, in the network 200, concept instance 240 is used as a connection point between asset reference 201 and the "Printer" concept 214. A single concept can have multiple instances that descend from the concept. Each concept instance is uniquely defined by the concept from which it descends and by its detail associations (explained later) to other tag network elements. Thus, through the use of concept instances, particular interconnections to a concept can remain logically distinct and separate from other interconnections to that concept. In some implementations, concept instances may be created automatically by the server 111 whenever an association to a concept element or between concept elements is created.

In addition to concepts, instances, and asset references, a tag network can include primitive data elements. Primitive data elements are general-purpose storage types used to represent, for example, integers, floating-point numbers, character strings, and dates that are entered by a user or created in the system 100. For example, in the tag network 200, a string primitive is used to store the string value "HP 1703 Specification" 260 and a date primitive is used to store the date 261 that the asset was first encountered. The string primitive 260 may be entered by a user while the data primitive 261 may be set by the computer 110. The value of a primitive data element can be dynamically altered.

By interrelating concepts, instances, asset references, primitive elements, and other tag model elements, a meaningful description of a stored asset can be structured. Such interrelations can be provided through association relationships ("associations"). Associations can be specified by a user when a non-hierarchical relationship exists between a source and a target concept, concept instance, asset reference, or primitive data element. In the tag network 200, associations are shown as dashed lines 250-256. For example, in the network 200, asset reference 201 pertains to a document about monochrome printers. Asset reference 201 is therefore logically related to the printer concept 214 but is not a subdivision of the printer concept 214. Since asset reference 201 is not a sub-division of the printer concept 214, it is semantically incorrect to use a refinement relationship to interconnect the asset reference 201 and the Printer concept 214. Instead, the relationship between the asset reference 201 and Printer concept 214 is specified through the use of an association 251.

Associations include "about" associations 250-251 and "named" associations 252-256. An about association provides information "about" a source that is expressed by a target. For example, an about association 250 exists between asset reference 201 and the instance 245 of the "Jasper" concept 224. The association 250 thereby describes the asset referred to by the reference 201 as being "about" the Jasper project 224. Associations between a source and target can also be described using named associations. Named associations include additional information describing the nature of the association between the source and target of the association.

The additional detail provided by a named association is referred to as the "relation" between the source and target. In the tag semantic network 200, named associations 252-256 have, respectively, relations 272-276 entitled "Author", "Primary Author", "Encounter Via", "Encounter On", and "Title." A named association's relation provides further information regarding the association between a source and a target. For example, the named association 253 has the "Primary Author" relation 273, This relation 273 indicates that "Jones" 222 is the primary author of the document referred to by asset reference 201. In various implementations, an "about" association may be implemented as a named association with a blank or null-value as its name or a particular predetermined relation value may be used to indicate "about" associations.

Figure 4:
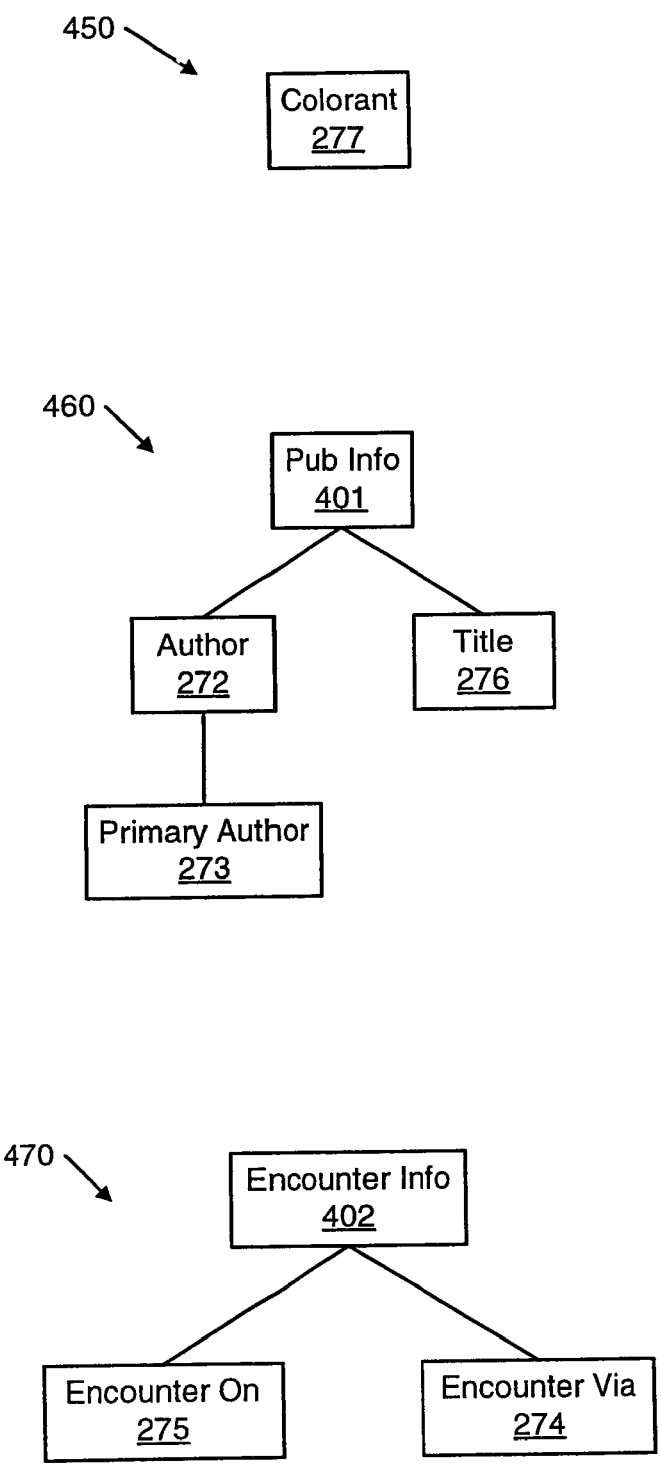
FIG. 4 is a hierarchy of data elements according to the invention.

Like concepts, relations can be user defined and hierarchically-organized. As shown in FIG. 4, three hierarchies 450, 460, 470 are formed from relations 272-277, 401, and 402. Relations 272-277 are referenced by named associations 252-257 (FIG. 2) while relations 401 and 402 exist in the hierarchies 460 and 470 but are not referenced by a named association. The hierarchical organization of relations, like that of concepts, facilitates navigation of a tag network and facilitates searching for data in the tag network. For example, a user may wish to search for a document with an author of "Jones." To do so, search routines are used to search the tag network 200 to find an association with the relation "Author" interconnecting an asset reference and an instance of the "Jones" concept. In the network 200, no such association exists. However, using the relation hierarchy 460 (FIG. 4), a search routine could determine that the "Primary Author" relation 273 is a subdivision of the "Author" relation 272 and therefore satisfies queries requiring the "Author" relation 272. Thus a search routine could determine that the asset reference 201 having a "Primary Author" of "Jones" satisfies a query for assets with an "Author" of "Jones." As with searching over concepts, searching over relations may also consider only the specified relation or ancestors of that relation.

Figure 3B:
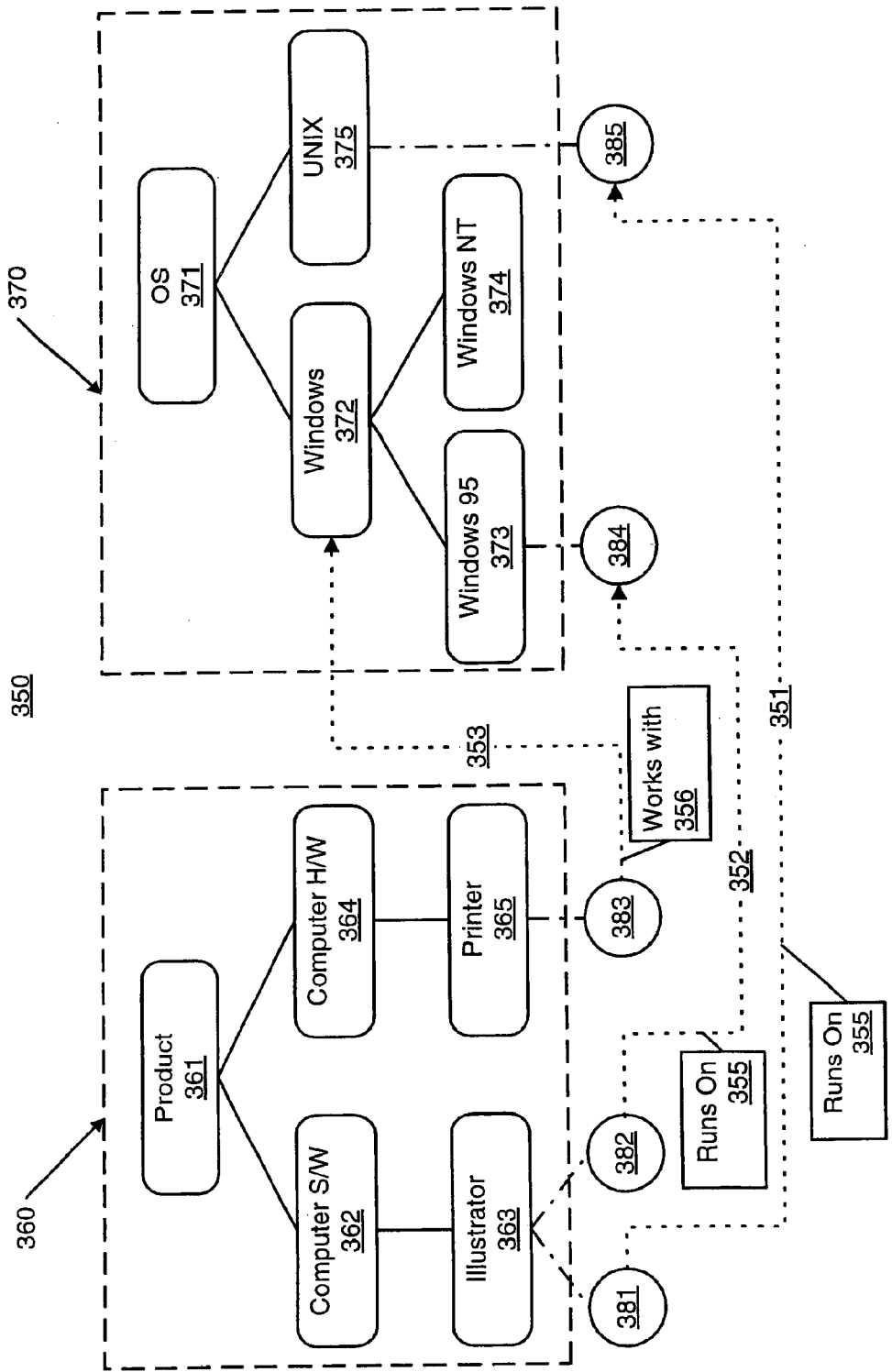

At times, a user may wish to refine one or more concepts without creating further subdivisions of the particular concepts. This may be desirable where, for example, a second and distinct concept hierarchy includes the desired subdivision information. In such a case, the user may want to subdivide a concept using information from the second hierarchy but without duplicating the second hierarchy as a descendent of the concept to be subdivided. For example, as shown in FIG. 3B, a tag network 350 includes concept hierarchies 360 and 370. Concept hierarchy 360 including concepts 361-365 related to products and, in particular, includes concept 363 representing the Adobe Illustrator® software product. Concept hierarchy 370 includes concepts 371-375 related to computer operating systems. A user may wish to subdivide the Illustrator concept 363 based on operating systems that the software runs on. Although a user can use refinements to subdivide the Illustrator concept 363 into additional operating-system dependent subdivision concepts, it may be preferable to refer instead to the concept hierarchy 370. To do so, the user can make use of a particular type of association referred to as a 'detail' association.

A detail association permits a user to subdivide a concept or instance using a reference to another concept or concept hierarchy in a tag network. In the network 350, detail associations are shown as dotted lines 351-353 interconnecting instances 381-383 with, respectively, concept 372 and with instances 384 and 385. A detail association, like a named association, includes a relation. Detail associations 351 and 352 each include the "Runs On" relation 355 while detail association 353 includes the "Works with" relation 356. The detail's relation describes the nature of the details being added to the concept or instance. For example, instance 381 of the Illustrator concept 363 has detail association 351. The detail association 351 has the "Runs On" relation 355 and couples the instance 381 to an instance 385 of the UNIX® operating system concept 375. The detail association 351 thereby indicates that the instance 381 of the Illustrator concept 363 refers to a version of the Adobe Illustrator® software that runs on a UNIX operating system. Consequently, if an asset reference were to have an about association to the instance 381 it would indicate that the referenced asset was 'about' Illustrator software running on a UNIX operating system.

Each instance or concept can include multiple detail associations. For example, instance 381 could include a second detail association (not shown) having the relation "version" to a numeric primitive element having a value of 5.5 (not shown). The combination of the detail 351 with this second detail would indicate that instance 381 refers to version 5.5 of Illustrator that runs on UNIX. Each concept instance, e.g., 381-385 of FIG. 3, in a tag semantic network is uniquely defined by its parent concept and its collection of detail associations. In various implementations, relation hierarchies may or may not be considered during a search for a particular detail. Thus, in some implementations, a search for a instance having a particular detail association will be so satisfied only by the detail having the particular specified relation.

Implementations of the tag model may also include rules placing particular requirements or restrictions on the organization of tag data. These rules, known as prescriptions, can help ensure a consistent and meaningful organization of tag data. For example, a consistent organization of tag data may be enforced by prescriptions requiring particular detail associations for instances of a specified concept. The tag model may also include prescriptions limiting refinements, associations, and the accepted data range for the values of particular primitive elements. Prescriptions affecting a concept or relation may be inherited by descendent concepts, instances and relations. For example, as shown in FIG. 3B, the computer software concept 362 may have a prescription requiring all instances of the concept 362 to include a "Runs On" detail association. This prescription may be inherited by descendent concepts such as the Illustrator concept 363 thereby requiring instances 381 and 382 of the Illustrator concept 363 to have a detail including the "Runs On" relation 355. Inherited prescriptions may affect both population of data structures and navigation of the tag network. For example, during searching and data entry, if a user fails to specify a particular required detail association, that detail may, by default, have a distinguished target value of "all." The "all" value will match any particular value specified in a search.

In a multi-user implementations, tag model data may be simultaneously accessed, deleted, and updated by multiple users or software processes. Alterations made by a first user or application may, in some circumstances, be problematic. In particular, alterations made by a first user or application may change the aggregate information in the tag model database so as to alter a second user's or program's understanding of the information. The second user or application may thereafter behave in an erroneous manner due to its incorrect understanding of the state of the tag model data. Therefore, the tag model may implement a data integrity mechanism called a 'contract' that avoids such errant behavior. A contract is a request between a user or application and the tag model database indicating that the requesting user or application needs to maintain a particular view of certain specified tag model elements. When a contract has been established, the tag model database server limits alterations that can be subsequently so made. If a second user or application requests a change to the tag model database, and that change would cause a contract to be broken, the tag model database server may prevent the operation or may require the second user to explicitly break the contract such as by entering a command to override the contract.

Figure 10:
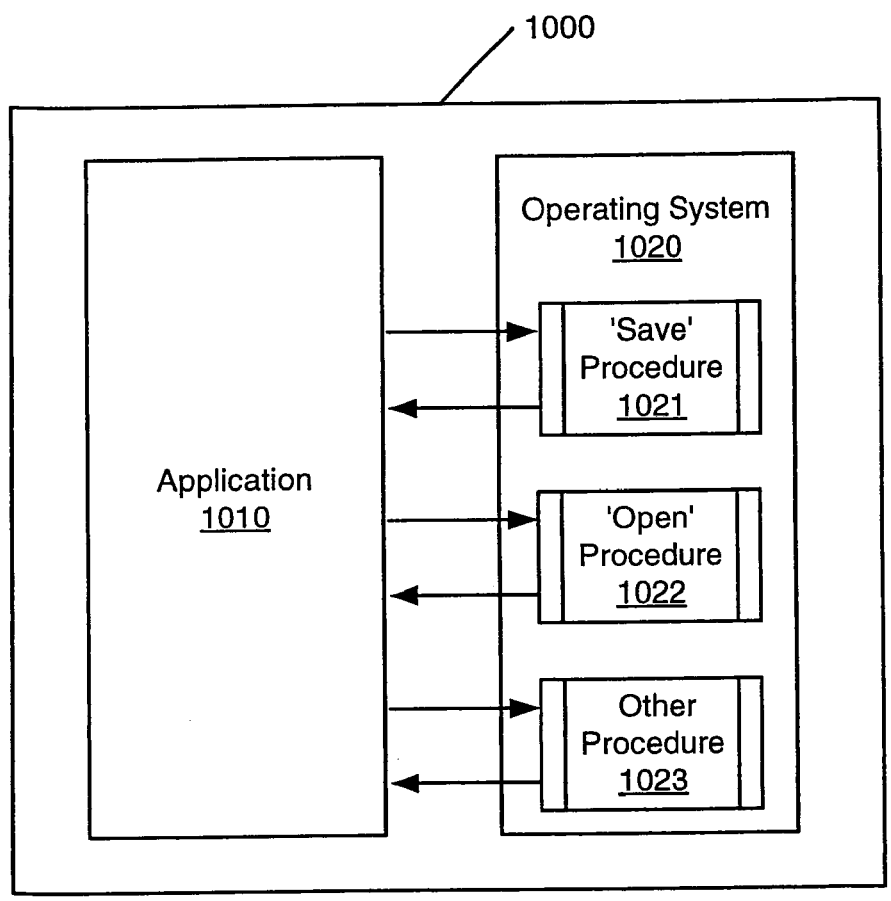
FIG. 10 is a computer system software architecture according to the invention.

Tag data may be presented and manipulated independent of specific software applications. This can be done, for example, using modified operating system functions or through the use of a tag data helper application. As shown in FIGS. 1 and 10, a computer 110 has a software environment 1000 including one or more application software programs 1010 and operating system software 1020. The application software 1010 is, for example, the Adobe Illustrator program and the operating software 1020 is, for example, a graphical user interface (GUI) operating system such as Microsoft Windows 95. By modifying operating system software 1020, operations on data in the tag database 113 can be initiated by a software application 1010 without requiring the explicit alteration of the application.

Modifications to the operating system 1020 to provide tag data features can include modifications to operating system procedures that provide 'Save' 1021 and 'Open' 1022 functionality. Such procedures may be used to create a file system handle that is subsequently used by the operating system 1020 or application procedure 1010 to store, retrieve, or manipulate a data asset. As shown in FIGS. 10, 11A and 11B, a GUI operating system 1020 typically includes graphical interface functions to facilitate file 'Save' and 'Open' operations. These save and open may be initiated by a selection provided in a graphical menu and, when initiated, may provide functions as shown in FIG. 11A. In particular, 'Save' and 'Open' operations may present a GUI interface to receive input from a user 1061. In response, asset storage data is received from the user 1064. The received data identifies a location in the storage system 112 (FIG. 1) where a data asset can be stored or where a previously stored data asset can be found. Additionally, a file system handle is determined 1067 and provided to the application that initiated the 'Save' or 'Open' operation 1068. The application may subsequently use the file handle to store or manipulate a data asset in the storage system 112 (FIG. 1).

'Save' and 'Open' procedures provided by an operating system 1020 can be modified and the modified procedures linked to a program application to access and manipulate tag data. For example, "Save" and "Open" procedures provided in a dynamically linked library (such as in a Microsoft Windows 95 ".dll" dynamically linked library) can be modified. When an application using the particular dynamically linked library is linked to the modified library, such as by operating system run-time linking procedures, the new tag database capabilities present in the modified library will be available to the application. As shown in FIGS. 1, 10A and 10C, data asset software access procedures executing on a computer 110 can include functions to store and manipulate tag data in a tag database 113 (FIG. 1) when these operating system 'Save' and 'Open' functions are initiated by an application 1010.

Referring to FIGS. 1, 10 and 11B, to manipulate tag data in the database 113 'Save' and 'Open' procedures can, for example, present a GUI interface to receive asset location information from a user 1071. Additionally, an initial query is sent from the operating system 1020 to the tag server 111 to determine the state of tag networks in the tag database 113. The initial query can be sent using operating system remote procedure calls to send a request to the tag server 111. In response, the tag server may return a listing of all concepts, named associations, and relations that can be associated with a data asset being saved or that can be searched for during an 'Open' operation.

Tag information returned by the tag server 111 to the save 1021 or open 1022 procedure can then be displayed to a user using a tag data interface (step 1173). The tag data interface (step 1173) can be a graphical user interface that allows a user to select particular tag elements, enter new tag elements, or compose arrangements of elements such as concepts, associations, relations, and details. During a file open operation, the tag data received at the interface (step 1173) can be used to form a second tag query (step 1174). In response to the query (step 1174), the tag server 111 can invoke search routines to identify a list of data assets and their storage locations. This data asset list can be returned to the 'Open' procedure and presented to the user of the computer 110 (step 1175). The user can then select one of the listed assets as the target of the "Open" procedure (step 1176). Subsequently, a file handle is determined (step 1177) and returned to an application 1110 for subsequent use by application 1010 and operating system 1020 so software procedures (step 1178). An application program may subsequently manipulate the identified asset. Many modifications may be made to the exemplary procedures of FIGS. 11A and 11B. Additionally, modified operating system procedures are not limited to procedures like 'Open' and 'Save,' but may be extended to many types of operating system procedures. For example, if a data asset is to be printed, the print procedures can query the tag server 111 (FIG. 1) to determine printer-related characteristics of the data asset. For example, data in the tag database 113 (FIG. 1) may indicate that the data asset is a color picture and therefore should be printed using a color output device.

Modified operating system procedures are only one way to access, create, and manipulate tag data. A tag data viewer application can be used to access, create, and manipulate data in the tag database. A tag data viewer is a software application that exchanges data with the tag server 111 (FIG. 1) to manipulate data in the tag database 113. The tag viewer provides software functions to identify particular assets in the storage system 112. These functions can include Internet browser-like functions to select data stored on hypertext markup language (HTML) servers. Additionally, functions to examine data assets in a database, on a hard disk, or on a collection of network servers may be included. For example, a tag viewer can be used to browse directories graphically in a hierarchical file system. Once a user has identified a data asset using the tag viewer, the asset can be associated with tag data. The tag viewer may query the tag server 111 to identify tags that can be associated with the identified asset, present the identified tags to a user, allow a user to select tags, and facilitate the creation of new tags and tag interrelations.

A tag semantic network can be implemented using various data structuring techniques. In the embodiment described below, the tag semantic network is implemented using multiple tables stored in a relational database. As shown in FIGS. 5-9, in an exemplary relational database implementation, the tag model uses the following database tables: "Asset_Refs" 500, "Concepts" 600, "Concept_Instances" 625, "Concept_Refinements" 650, "Relations" 700, "Relation_Refinements" 725, "Associations" 800, "Strings" 900, "Numbers" 925, "Dates" 950. The tables in FIGS. 5-9 correspond to the examples in FIGS. 2, 3A, and 4.

As shown in FIG. 5, asset references can be stored in the "Asset_Refs" database table 500. Each row of the table 500 encodes a separate asset reference. An encoded asset reference includes, for example, a URI (Uniform Resource Identifier) or other data identifying how the asset is accessed. Each asset reference may also include format information to indicates the type of stored asset. For example, the format identification information can be used to indicate that the stored asset is a text file or an Adobe Photoshop® file. Each asset reference may also include an identification number that uniquely identifies the asset reference. The identification number may be used in other tag model database tables to identify the asset reference.

As shown in FIG. 6, concept definitions can be stored in the "Concepts" table 600. For each concept in the tag model, the table 600 includes a row having a unique numerical identification, the concept's unique name, and an indication of whether the concept is anonymous. For example, the product concept 210 (FIG. 2) is stored as the unique name string "Product" and the unique identification number 210. The identification number is a mechanism used to refer indirectly to the concept definition in other tag model database tables. In alternative implementations, the unique concept name, a memory pointer, or other identifier may also be used to refer to a concept. Concept instances can be stored in the "Concept_Instances" table 625. Each row of the Concept_Instances table 625 includes a unique instance identification number and the identification number of the concept to which the instance refers.

Concept refinements can be stored in the "Concept_Refinements" table 650. The "Concept_Refinements" table 650 defines the hierarchical relationships among concepts in the "Concepts" table 600. In the table 650, concepts are identified by the concept identification numbers defined in table 600. Each row of the "Concept_Refinements" table 650 defines a relationship between an ancestor concept and a descendent concept (ancestor-descendent relationships include parent-child relationships, in which there is a direct relationship between the ancestor and the descendent, and also include relationships in which the ancestor and descendent are separated by multiple hierarchical levels). Multiple child concepts can be directly connected to a common parent concept thereby forming subdivisions of the parent conceit. For example, rows 651-654 form the hierarchical concept relationship 300 (FIG. 3A). Multiple parent concepts can be directly connected to a common descendent concept (not shown). The "Concept_Refinements" table may also indicate indirect relationships in the concept hierarchy. For example, row 660 of table 650 indicates that the Illustrator concept is a descendent of the Product concept. However, since the Illustrator concept is at a minimum distance of '2' from the Product concept, the Product concept is not a parent ancestor of the Illustrator concept. Indirect relationships can be used to optimize search functions by allowing ancestor-descendent relationships to be determined without traversing a concept hierarchy at search time. The distance between concepts need not be included in the "Concept_Refinements" table 650 if only parent-child relations (i.e., direct relations between ancestor and descendent concepts) are represented.

As shown in FIG. 7, relations can be stored in the "Relations" table 700. For each relation in the tag model, the table 700 includes a row having a unique numerical identification and the relation's unique name. For example, the "Title" Relation 434 (FIG. 4) is stored in row 703, which includes the relation name "Title" and the identification number '276'. Relation identification numbers are used to refer indirectly to the relation in other tag model database tables. In alternative implementations, the unique relation name, a memory pointer, or other identifier may also be used to refer to the relation.

Relation refinements can be stored in the "Relation_Refinements" table 725. The "Relation_Refinements" table 725 defines the hierarchical relationship among relations in the "Relations" table 700. Each row of the table 725 defines a relationship between an ancestor Relation and a descendent Relation. Multiple descendent Relations can have a common ancestor Relation thereby forming subdivisions of the ancestor Relation. For example, rows 726-728 form the Relation hierarchy 460 (FIG. 4). Like the "Concept_Refinements" table 650, the "Relation_Refinements" table 725 may, in various implementations, indicate indirect relationships by including, for example, indirect relations and minimum distance data.

As shown in FIG. 8, primitives can be stored in tables 800, 825, 850. The tables 800, 825, 850 store, respectively, string primitives, numeric primitives, and date primitives. Each row of primitive tables 800, 825, 850 includes an identification number and the value of the primitive. The identification number may be used as the target of an association. An implementation may also include additional tables or language type identification information stored along with data representing other primitive elements.

As shown in FIG. 9, the "Associations" table 900 can store associations between source and target concepts, instances, asset references and primitive values. Each row of the table 900 defines an association between a source and a target. Additionally, each row of the table 900 includes a source type identifier and a target type identifier. For example, the type identifiers 'A', 'C', 'I', 'S', 'N', 'D', are used to designate asset references, concepts, concept instances, string primitive elements, numeric primitive elements, and date primitive elements, respectively. The use of source and target type identifiers in the table 900 facilitates determination of the source's or target's definition table 500, 600, 625, 700, 800, 825, 850. Additionally, for each named association, the table 900 includes the numeric identifier corresponding to a relation defined in table 700 (FIG. 7). In the case of About associations, a Relation is not designated. The table 900 further includes a column "Is_A_Detail" indicating whether a particular named association is a detail association. In various implementations, various association type, A, C, I, S, N, 'D' may be stored in a separate table as may detail associations.

The encoding of the tag model allows complex queries to be generated. For example, the target of a search can include enumerations of concepts, relations, or primitive values, string regular expressions, and ranges of values. Additionally, searching and manipulation of tag model data can be performed using conventional database query languages. For example, in a relational database implementation supporting the structured query language (SQL) and having database tables such as those illustrated in FIG. 5 through FIG. 9, a user query for documents about computer hardware authored by "Simons" may be translated into the structured query language (SQL) query of Table 1 to retrieve relevant asset references.

TABLE 1

```
-- comments go from "--" to new-line.
    ( -- Asset_Refs of <Document> AND_NARROWER
    -- <ABOUT>
    -- Concept_Insts of <Computer H/W> AND_NARROWER
    select "Source" from "Associations"
    where "Source" in ( -- Asset_Refs of <Document>
    AND_NARROWER
        select "ID" from "Asset_Refs"
        where "Class" in ( -- <Document> AND_NARROWER
            <Document>
        union
            select "Descendent" from "Concept_Refinements"
            where "Ancestor" = <Document> ))
    and "Relation" = <ABOUT>
    and "Target" in ( -- Concept_Insts of <Computer H/W>
    AND_NARROWER
        select "ID" from "Concept_Insts"
        where "Concept" in ( -- <Computer H/W>
        AND_NARROWER
            <Computer H/W>
        union
            select "Descendent" from "Concept_Refinements"
            where "Ancestor" = <Computer H/W> )))
intersect
    ( -- Asset_Refs of <Document> AND_NARROWER
    -- with Associations named <Author> AND_NARROWER to
    -- Concept_Insts of <Simons> AND_NARROWER
        select "Source"
        from "Associations"
        where "Source" in ( -- Asset_Refs of <Document>
        AND_NARROWER
            select "ID" from "Asset_Refs"
            where "Class" in ( -- <Document> AND_NARROWER
                <Document>
```

TABLE 1-continued

```
                union
                    select "Descendent" from
                    "Concept_Refinements"
                    where "Ancestor" = <Document> ))
        and "Relation" in ( -- <Author> AND_NARROWER
                <Author>
                union
                    select "Descendent" from "Relation_Refinements"
                    where "Ancestor" = <Author> )
        and "Target" in ( -- Concept_Insts of <Simons>
        AND_NARROWER
                select "ID" from "Concept_Insts"
            where "Concept" in ( -- <Simons> AND_NARROWER
                <Simons>
                union
                    select "Descendent" from "Concept_Refinements"
                    where "Ancestor" = <Simons> )))
```

The interface to the tag model database can be a graphical user interface (GUI). In a GUI implementation, such as that provided by the Apple MacOS® operating system or the Microsoft Windows 95 operating system, search queries can be entered using graphical interface elements such choice lists, push buttons, check boxes, and text entry dialog boxes. Such graphical interface elements may provide an interface to a search query generation routine. For example, a GUI may present a list of concept elements which can be selected to define a search query. The selected concept elements can then be used by a query generation routine to generate SQL or other query code and thereby to interact with the tag model database. Additionally, the GUI interface can contain interface functionality to input concept element names, input relation element names, manipulate hierarchies of concepts and relations, define asset references, and define interconnections between such elements. In non-GUI implementations, these functions may be performed by inputting text and commands using a keyboard in response to computer system prompts. In a program-to-program implementation, the interface to the tag model database may be an application programming interface accessible to other software programs. For example, a program may use the tag model database to logically structure and organize data associated with the internal operation of the first program. Such data may be hidden from a human user of the first program.

In some implementations, the all or part of the storage system 112 and tag database 113 can be on the same storage media, while in other implementations, the tag database is stored separate from the asset database and may be distributed across a network of storage servers. Additionally, the tag database server 111 can be a software process executing on a dedicated server computer or, in some implementations, all or part of the server 111 can be a software process executed at the computer 110 along with various user applications. Furthermore, the tag database 113 may include predefined tag elements. For example, a tag database 113 having predefined concepts, relations, and details describing various work and leisure activities may be provided.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Still other embodiments are within the scope of the following claims.

What is claimed is:

1. A tangible machine-readable storage medium embodying instructions that, when executed by machine, cause the machine to perform operations comprising:
    establishing a database of concept data elements, asset references, and associations, the concept data elements each representing a concept and having a hierarchy specified by concept hierarchy information, the asset references each comprising a storage location identifier for a corresponding one of a plurality of data assets, and the associations representing different types of relations between one of the plurality of data assets and one of a plurality of concepts represented by the concept data elements, wherein the database is linked to a location interface;
    causing the location interface to be presented to a user;
    receiving a query from the user through the location interface, the query including location information and identifying a concept and a relationship, the location information relating to a location of a desired data asset;
    using the query to search the database to identify a set of data assets each having the relationship with the concept; and
    presenting to the user information identifying the data assets in the set.

2. The tangible machine-readable storage medium of claim 1, wherein the instructions to receive from the user a query identifying a concept and a relationship include instructions to receive from the user a query further identifying a second concept and a second relationship; and wherein each data asset in the identified set of data assets having the relationship with the concept has the second relationship with the second concept.

3. The tangible machine-readable storage medium of claim 1, wherein:
    the instructions to establish a database of concept data elements, asset references, and associations include instructions to establish a database that includes detail associations, each detail association representing a relationship between a first and a second concept;
    the instructions to receive from the user a query that identifies a concept and a relationship includes instructions to receive from the user a query that further identifies a second concept and a second relationship, the second concept and the second relationship representing a detail association; and the instructions to use the query to identify a set of data assets includes instructions to use the query to identify a set of data assets where each data asset in the identified set of data assets has a detail association comprising the second relationship between the concept and the second concept.

4. The tangible machine-readable storage medium of claim 1, wherein the query includes the concept and the relationship.

5. A computer system comprising:

a processor;

means for establishing a database of concept data elements, asset references, and associations, the concept data elements each representing a concept and having a hierarchy specified by concept hierarchy information, the asset references each comprising a storage location identifier for a corresponding one of a plurality of data assets, and the associations representing different types of relations between one of the plurality of data assets and one of a plurality of concepts represented by the concept data elements; and means for linking a location interface to the database, the location interface configured to receive location information related to the location of a desired data asset;

means for presenting the location interface to a user, the location interface configured to receive a query from the user, the query including location information and identifying a concept and relationship, the location information relating to a location of a desired data set;

means for using the query to search the database to identify a set of data assets each having the relationship with the concept; and means for presenting to the user information identifying the data assets in the set.

6. The computer system of claim 5, further comprising:

means for receiving search information from the database identifying concepts and relationships that can be searched;

means for displaying the search information to the user through a query interface that allows the user to define the query; and means for displaying, in response to the query, information identifying data assets satisfying the query.

7. The computer system of claim 6, further comprising:

means for receiving a selection from the user of a desired data asset from among the identified data assets; and means for returning to an application a file handle for the desired data asset.

8. The computer system of claim 5, wherein the means for using the query to identify a set of data assets further comprise means for finding each asset reference in the database having the relationship with the concept.

9. The computer system of claim 5, wherein the means for using the query to identify a set of data assets further comprise means for finding each asset reference in the database having the relationship with the concept and each asset reference in the database having the relationship with a hierarchical descendent of the concept.

10. The computer system of claim 5, wherein:

the relationships have a hierarchy specified by relationship hierarchy information; and the means for using the query to identify a set of data assets further comprise means for finding each asset reference in the database having the relationship with the concept and each asset reference in the database having a hierarchical descendent of the relationship with the concept.

11. The computer system of claim 5, wherein:

the means for receiving from the user a query identifying a concept and a relationship further comprise means for receiving from the user a query further identifying a second concept and a second relationship; and each data asset in the identified set of data assets having the relationship with the concept has the second relationship with the second concept.

12. The computer system of claim 5, wherein:

the means for establishing a database of concept data elements, asset references, and associations further comprise means for establishing a database that includes detail associations, each detail association representing a relationship between a first and a second concept;

the means for receiving from the user a query that identifies a concept and a relationship further comprise means for receiving from the user a query that further identifies a second concept and a second relationship, the second concept and the second relationship representing a detail association; and the means for using the query to identify a set of data assets further comprise means for using the query to identify a set of data assets where each data asset in the identified set of data assets has a detail association comprising the second relationship between the concept and the second concept.

13. The computer system of claim 5, wherein the query includes the concept and the relationship.

14. The computer system of claim 5, the means for establishing a database of concept data elements, asset references, and associations further comprise means for establishing a database that includes detail associations that describe relationships between concepts in the database, the relationships selected from a plurality of different types of relationships.

15. The computer system of claim 5, further comprising:

means for presenting to a user a storage interface to receive location information from the user to identify a storage location identifier for a data asset to be saved;

means for linking the storage interface to the database;

means for receiving from the user through the location interface a query identifying a concept and a relationship;

means for receiving from the user through the storage interface the location information for the data asset to be saved and a selection identifying a concept and a relationship between the concept and the data asset to be saved; and means for storing in the database of a memory an asset reference for the data asset to be saved and creating in the database an association representing the identified relationship between the data asset to be saved and the identified concept.

16. The computer system of claim 15, further comprising:

means for receiving tag information from the database identifying concepts and relationships that can be selected during a "save" operation; and means for displaying the tag information to the user through a tag data interface, the tag data interface allowing the user to select tag elements to identify associations for data assets to be saved.

17. The computer system of claim 15, further comprising:

means for presenting to the user a tag creation interface to receive information from a user to define a new concept; and means for storing a new concept data element representing the new concept in the database.

18. The computer system of claim 17, further comprising:
means for receiving from the user through the tag creation interface hierarchy information identifying a hierarchical relationship between the new concept and the plurality of concepts; and
means for storing concept hierarchy information representing the hierarchical relationship between the new concept and the plurality of concepts represented by the concept data elements in the database.

19. The computer system of claim 15, wherein:
the database includes a plurality of relationship data elements each identifying a relationship and having a hierarchy specified by relationship hierarchy information; and the computer system further comprises:
means for presenting to the user a tag creation interface to receive information from a user to define a new relationship; and
means for storing a new relationship data element representing the new relationship in the database.

20. The computer system of claim 19, further comprising:
means for receiving from the user through the tag creation interface hierarchy information identifying a hierarchical relationship between the new relationship and relationships identified by the plurality of relationship data elements; and
means for storing relationship hierarchy information representing the hierarchical relationship between the new relationship and the plurality of relationship data elements in the database.

21. The computer system of claim 19, wherein:
the database includes detail associations each representing a relationship between a first and a second concept; and the computer system further comprises:
means for receiving from the user through the tag creation interface new detail association information identifying a relationship between a first and a second one of the plurality of concepts; and
means for storing the new detail association information in the database.

22. The computer system of claim 15, wherein the database includes detail associations that describe relationships between concepts in the database, the relationships selected from a plurality of different types of relationships.

23. A computer implemented method, the method comprising:
establishing a database of concept one or more data elements, one or more asset references, and one or more associations, each concept data element representing a concept and having a hierarchy specified by concept hierarchy information, each asset reference comprising a storage location identifier for a corresponding one of a plurality of data assets, each association representing a different type of relation between one of the plurality of data assets and one of a plurality of concepts represented by the concept data elements;
linking a location interface to the database;
presenting the location interface to a user;
receiving a query from the user through the location interface, the query including location information and identifying a concept and a relationship, the location information relating to a location of a desired data asset;
using the query to search the database to identify a set of data assets each having the relationship with the concept; and
presenting to the user information identifying the data assets in the set.

* * * * *